April 7, 1959 — D. C. ZANDER — 2,880,507
PORK FAT TRIMMING KNIFE
Filed Feb. 25, 1957
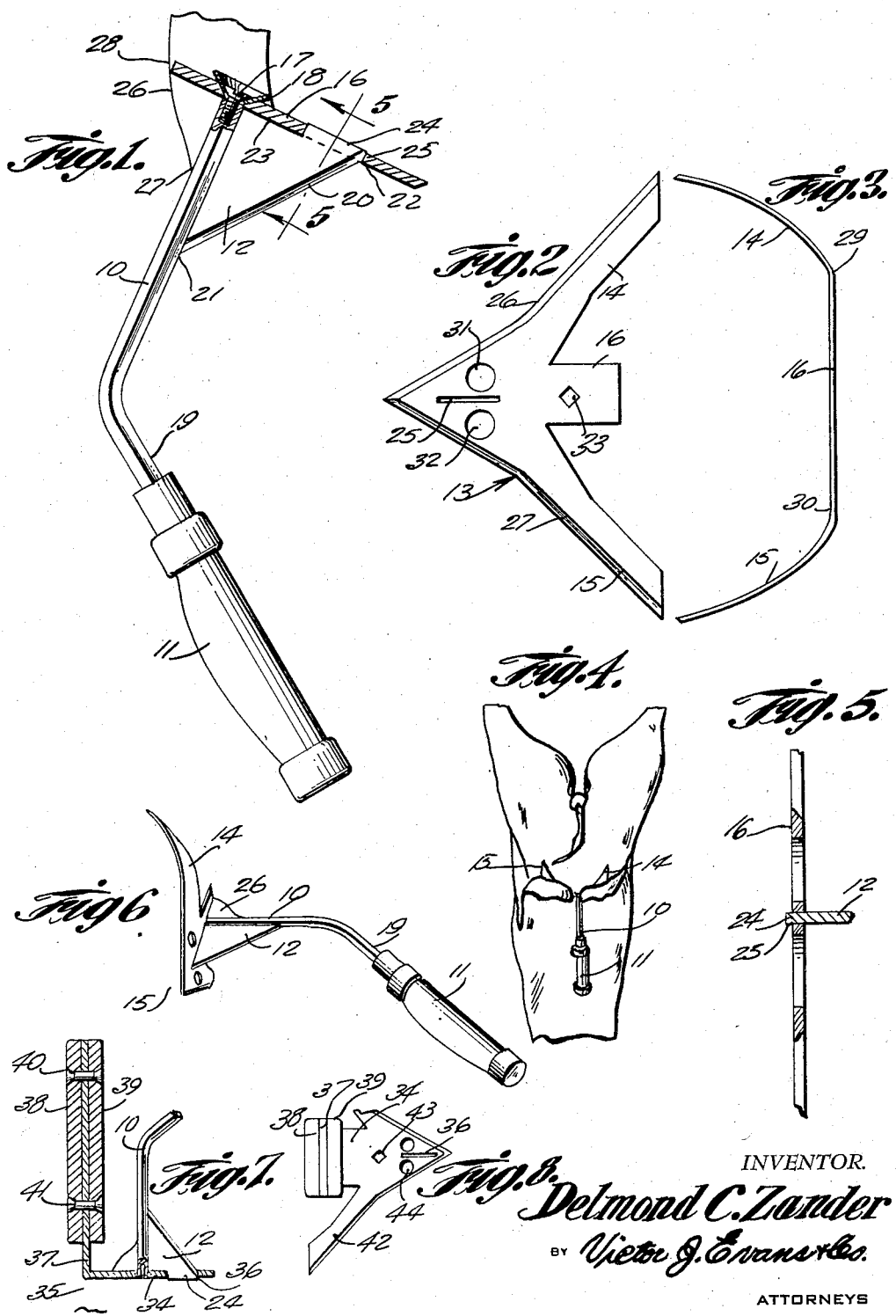
INVENTOR.
Delmond C. Zander
BY Victor J. Evans & Co.
ATTORNEYS

United States Patent Office 2,880,507
Patented Apr. 7, 1959

2,880,507

PORK FAT TRIMMING KNIFE

Delmond C. Zander, Wapato, Wash.

Application February 25, 1957, Serial No. 641,939

3 Claims. (Cl. 30—317)

This invention relates to knives used in butchering stock and particularly hogs, and in particular a knife having a plurality of cutting edges positioned on an angularly disposed end portion of the shank of a handle with a ripping knife blade positioned on one side of the shank and with shaving or slicing hoop blades extended from both sides of the ripping knife blade whereby excess fat of pork loins and pork butts is readily removed.

The purpose of this invention is to expedite trimming fat from pork loins and pork butts in butchering hogs wherein such fat is readily removed with substantially a single stroke of a single operator.

After skinning and cleaning hogs the bodies are suspended by grambels positioned with pointed ends extended through the rear legs of the hog and excess fat and other extending particles are trimmed from the legs and loins with relatively short sharp knives. This operation requires considerable time and where hogs are butchered in quantity the trimming operation is relatively costly. With this thought in mind this invention contemplates a trimming knife having a plurality of blades positioned at various angles at the end of the shank of a handle wherein the legs are ripped apart and excess fat removed with substantially a single operation and wherein hoop blades extended at the sides remove the fat from the loin as the knife is drawn downwardly over the back.

The object of this invention is, therefore, to provide a trimimng knife having a plurality of blades wherein blades in the forms of wings at the sides of a ripping knife blade wrap around the butt and loin as the ripping blade is used whereby substantially all fat is removed in an efficient manner.

Another object of the invention is to provide a hog fat trimming knife having a plurality of blades in which the blades are readily separated to facilitate cleaning and sharpening.

A further object of the invention is to provide a combination pork loin and pork butt trimming knife which is of a simple and economical construction.

With these and other objects and advantages in view the invention embodies an angularly disposed shank extended from a handle with a ripping knife blade extended from an inner side of the shank and with arcuate hoop knife blades secured to the end of the shank with a set screw and mounted to extend from sides of the ripping knife blade.

Other features and advantages of the invention will appear from the following description taken in connection with the drawing, wherein:

Figure 1 is a side elevational view of the improved trimming knife with parts of the head or end of the shank broken away and with parts of a hoop knife positioned on the end of the shank also broken away and other parts shown in section.

Figure 2 is a plan view of the hoop knife positioned on the end of the shank showing the hoop knife with the handle, shank and other parts omitted.

Figure 3 is an end elevational view of the hoop knife showing, in particular, the arcuate sections at the ends thereof.

Figure 4 is an elevational view with the parts shown on a reduced scale illustrating the use of the knife and showing the knife with parts thereof embedded in the fat of a pork loin.

Figure 5 is a cross section through the intermediate portion of the base of the hoop knife taken on line 5—5 of Fig. 1 with the parts shown on an enlarged scale, and with parts broken away.

Figure 6 is a view illustrating the improved hog fat removing knife with the parts assembled and with the knife shown on a reduced scale in relation to the knife shown in Fig. 1.

Figure 7 is a cross section through the head of the knife, somewhat similar to that shown in Fig. 1 with the parts inverted and illustrating a modification wherein a handle is used on the hoop knife blade.

Figure 8 is a plan view of the knife shown in Fig. 7 with a wing at one side of the hoop knife broken away.

Referring now to the drawing wherein like reference characters denote corresponding parts the improved trimming knife of this invention includes a shank 10 having a handle 11 on one end and a ripping knife 12 extended from one side of the opposite end and a hoop knife 13 having arcuate wings 14 and 15 and a base 16 and the base of the hoop knife is secured to the end of the shank 10 with a screw 17 extended through a sealing washer 18.

As illustrated in Fig. 1, the shank 10 is provided with an angularly disposed handle section 19 on which the handle or grip 11 is positioned and the knife 12, which is provided with a sharp cutting edge 20, sharpened on both sides, extends from a point 21 to a point 22 and the upper edge 23 thereof is provided with a lug 24 that is positioned to extend into a slot 25 in the base 16 of the hoop knife. The shank is also provided with a triangular-shaped plate 26 that is positioned on the side of the shank opposite to that on which the blade 12 is positioned and the plate 26 extends from a point 27 to a point 28 on the extended end.

As illustrated in Fig. 3 the intermediate or base portion 16 of the hoop knife 13 extends laterally to points 29 and 30 and from these points the wings or ends of the blade extend upwardly forming the arcuate sections 14 and 15.

The base of the hoop knife is provided with openings 31 and 32 that are positioned to relieve suction as the blade passes through fat and the leading portion of the hoop knife is provided with sharp cutting edges 26 and 27.

The base 16 of the hoop knife is provided with a square hole or opening 33 that is secured on a square section at the end of the shank 10 by the screw 17.

The washer 18 is provided with a countersunk opening which receives the head of the screw 17 and the washer provides a gauge for regulating the thickness to correspond with the thickness of the base of the hoop blade.

In the design illustrated in Figs. 7 and 8 a base 34 of a hoop blade 35 is positioned on the end of the shank 10 with the lug 24 of the blade 12 extended into an opening 36 of the base and, in this design, the outer or leading end of the base 34 of the hoop blade is provided with an arm 37 upon which handle sections 38 and 39 are secured by rivets 40 and 41 thereby providing means for gripping the knife with both hands.

It will also be understood that similar gripping handles may be provided at other suitable points. The hoop blade 35 is provided with wings 42, similar to the wings 14 and 15 of the blade 13 and the base of the blade is also provided with a square opening 43 to receive the end of the shank and opening 44 for relieving suction.

In using the knife of this invention mechanical hog splitting equipment can be used to better advantage as the back fat, which interferes with the mechanical hog splitting equipment is out of the way permitting the machine to operate more efficiently. For such use the arcuate ends 14 and 15 of the hoop blade may be cut off or eliminated.

It will be understood that modifications, within the scope of the appended claims, may be made in the design and arrangement of the parts without departing from the spirit of the invention.

What is claimed is:

1. A trimming knife having a shank with an angularly disposed portion provided with a handle on one end thereof, a planar right angular shaped knife having the side thereof secured to the shank at the end opposite to the handle so that the base thereof is at right angles to the end of the shank, the hypotenuse of said knife having a sharpened edge thereon, a substantially V-shaped knife having a cutting edge on the outer edge thereof and the portions of said knife remote from the apex thereof having outwardly and upwardly extending wings provided with sharp edges, said V-shaped knife being mounted on the outer end of the shank so that the undersurface thereof is contiguous with the base of the right angularly shaped knife and the apex of the V-shaped knife extends laterally of the shank and beyond the hypotenuse of said right angularly shaped knife and the cutting edge of both of said knives coacting to trim an animal during the downward movement of the trimming knife.

2. A trimming knife as in claim 1, wherein means is provided for removably securing said V-shaped knife to the outer end of said shank.

3. A trimming knife as in claim 1, wherein a substantially triangular shaped supporting plate is secured to the shank in coplanar relation to said right angular shaped knife and extends outwardly of said shank in coplanar relation to said right angular shaped knife, an internally threaded bore in the outer end of said shank, a lug on the upper edge of said right angular shaped knife, and said V-shaped knife having a slot and an opening therein whereby said V-shaped knife is mounted on said lug and the outer end of said shank and retained thereon by reason of a washer positioned on said outer end and a set screw engaging the internally threaded bore of said outer end.

References Cited in the file of this patent

UNITED STATES PATENTS

| | | |
|---|---|---|
| 422,986 | Smith | Mar. 11, 1890 |
| 1,268,997 | Pruett | June 11, 1918 |
| 1,739,489 | Wagner | Dec. 10, 1929 |
| 2,133,208 | Nellis | Oct. 11, 1938 |

FOREIGN PATENTS

| | | |
|---|---|---|
| 141,834 | Sweden | Aug. 25, 1953 |